United States Patent
Ma et al.

(10) Patent No.: US 10,324,644 B2
(45) Date of Patent: Jun. 18, 2019

(54) MEMORY SIDE ACCELERATOR THREAD ASSIGNMENTS

(71) Applicant: HEWLETT PACKARD ENTERPRISE DEVELOPMENT LP, Houston, TX (US)

(72) Inventors: Kaisheng Ma, Palo Alto, CA (US); Qiong Cai, Palo Alto, CA (US); Cong Xu, Palo Alto, CA (US); Paolo Faraboschi, Palo Alto, CA (US)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 61 days.

(21) Appl. No.: 15/476,185

(22) Filed: Mar. 31, 2017

(65) Prior Publication Data

US 2018/0285011 A1  Oct. 4, 2018

(51) Int. Cl.
*G06F 12/00* (2006.01)
*G06F 3/06* (2006.01)
*G06F 15/78* (2006.01)
*G06F 9/48* (2006.01)
*G06F 9/50* (2006.01)

(52) U.S. Cl.
CPC .......... *G06F 3/0631* (2013.01); *G06F 3/061* (2013.01); *G06F 3/0683* (2013.01); *G06F 9/4881* (2013.01); *G06F 9/5044* (2013.01); *G06F 15/7821* (2013.01)

(58) Field of Classification Search
CPC ...... G06F 3/0631; G06F 3/061; G06F 3/0683; G06F 9/30079; G06F 3/3009; G06F 3/3867
See application file for complete search history.

(56) References Cited

U.S. PATENT DOCUMENTS

| | | |
|---|---|---|
| 9,495,223 B2 | 11/2016 | Ebcioglu et al. |
| 2007/0283358 A1 | 12/2007 | Kasahara et al. |
| 2010/0095152 A1* | 4/2010 | Darrington ......... G06F 11/1438 714/19 |
| 2011/0173155 A1 | 7/2011 | Becchi et al. |
| 2015/0177989 A1 | 6/2015 | Lowery et al. |

(Continued)

OTHER PUBLICATIONS

Ahn, J. et al., A Scalable Processing-in-memory Accelerator for Parallel Graph Processing, (Research Paper), Jun. 1-17, 2015, 13 Pgs.

(Continued)

*Primary Examiner* — Shawn X Gu
(74) *Attorney, Agent, or Firm* — Hewlett Packard Enterprise Patent Department

(57) ABSTRACT

Examples described herein include receiving an operation pipeline for a computing system and building a graph that comprises a model for a number of potential memory side accelerator thread assignments to carry out the operation pipeline. The computing system may comprise at least two memories and a number of memory side accelerators. Each model may comprise a number of steps and at least one step out of the number of steps in each model may comprise a function performed at one memory side accelerator out of the number of memory side accelerators. Examples described herein also include determining a cost of at least one model.

20 Claims, 6 Drawing Sheets

(56) References Cited

U.S. PATENT DOCUMENTS

2015/0242324 A1 8/2015 Novakovic et al.
2016/0085587 A1* 3/2016 Dube .................... G06F 9/5011
 718/104

OTHER PUBLICATIONS

Akin, B. et al., Data Reorganization in Memory Using 3D-stacked DRAM, (Research Paper), 2015, 13 Pgs.
Babak Falsafi , Tim Harris , Dushyanth Narayanan, and David A. Patterson."Rack-scale Computing" in Report from Dagstuhl Seminar 15421, vol. 5, No. 10, 2016.
Li, C.-S., et al., "Composable architecture for rack scale big data computing," Future Generation Computer Systems, 33 pages, 2016.
Daglis, A. et al., "SABRes: Atomic Object Reads for In-Memory Rack-Scale Computing," (Research Paper), 49th Annual IEEE/ACM Int'l Symposium on Microarchitecture, 2016, 13pg.
Guo, Q. et al., 3D-stacked Memory-side Acceleration: Accelerator and System Design, (Research Paper), 2014, 6 Pgs.
H. Wickham, "Tidy data," The Journal of Statistical Software, vol. 59.10, 24 pages, 2014.
Putnam, A. et al., A Reconfigurable Fabric for Accelerating Large-scale Datacenter Services, (Research Paper), 2014, 19 Pgs.
Extended European Search Report, EP Application No. 18164180.4, dated Aug. 3, 2018, pp. 1-8, EPO.

* cited by examiner

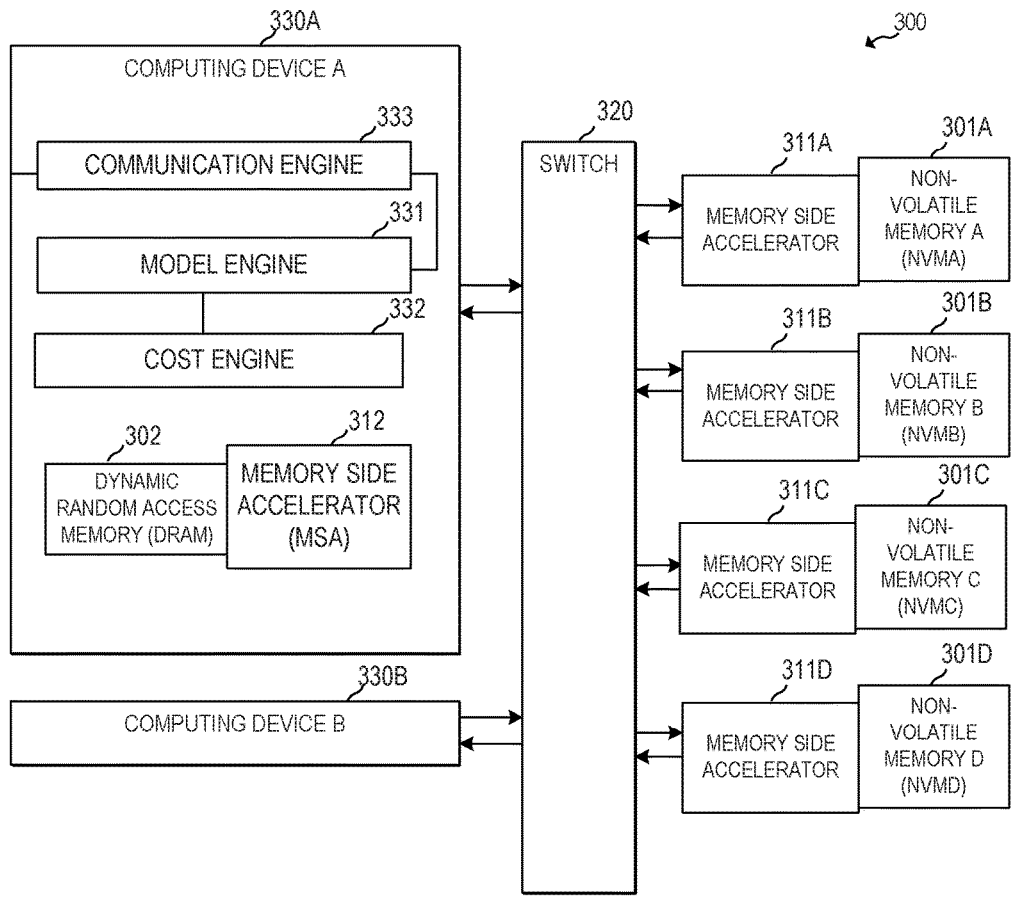
FIG. 3
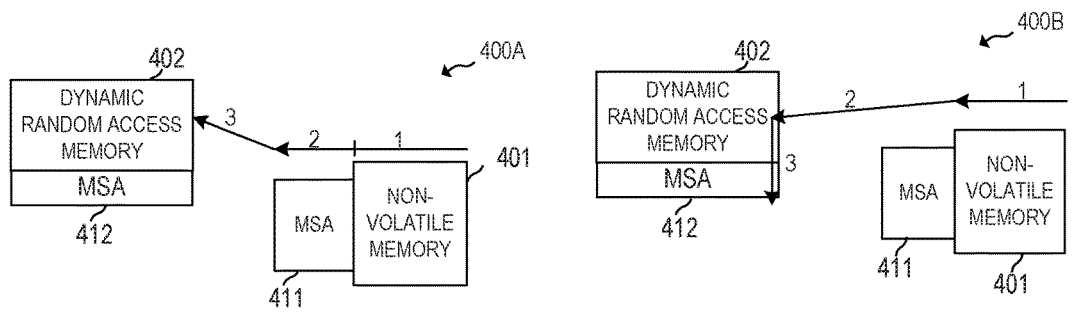
FIG. 4A  FIG. 4B

MEMORY SIDE ACCELERATOR THREAD ASSIGNMENTS

BACKGROUND

Memory side accelerators (MSAs) may be attached to a memory to accelerate data functions. They allow functions to be performed at a location that is physically closer to the data and may also help alleviate over-burdened central processing unit loads.

BRIEF DESCRIPTION OF THE DRAWINGS

The following detailed description references the drawings, wherein:

FIG. 3 is a block diagram of a rack-scale data center and a computing device to determine a cost of potential memory side accelerator thread assignments in the rack-scale data center, according to some examples.

FIG. 4A is a diagram of a first thread assignment to accomplish an operation pipeline, according to some examples.

FIG. 4B is a diagram of a second thread assignment to accomplish the same operation pipeline of FIG. 4A, according to some examples.

DETAILED DESCRIPTION

Figure 1:
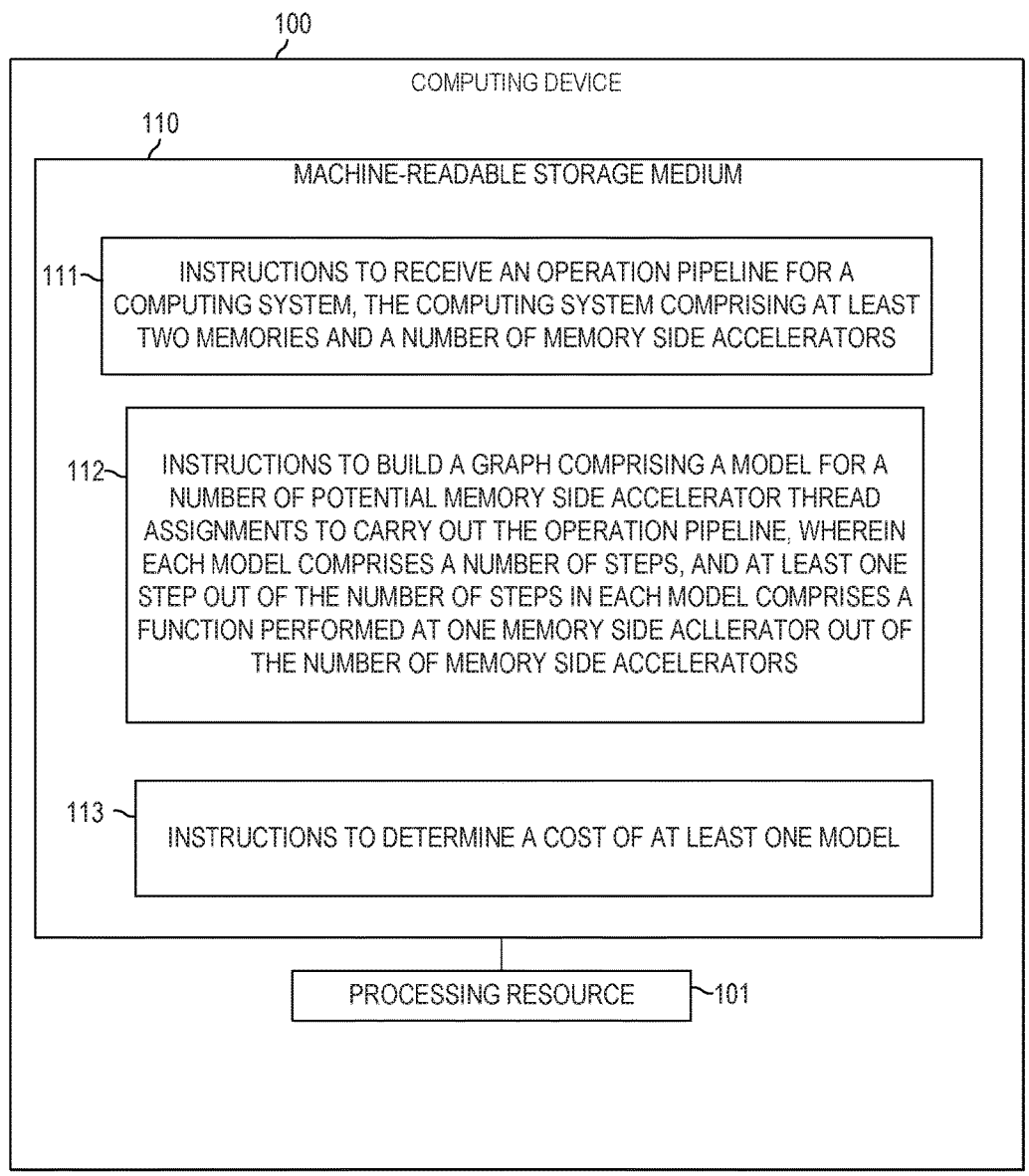
FIG. 1 is a block diagram of a computing device with instructions to generate a graph of potential memory side accelerator thread assignments, according to some examples.

In some examples, a memory side accelerator is a programmable piece of hardware that sits next to a memory. MSAs may be used to accelerate certain operations performed on the data stored in the memory. In a rack-scale, multi-level memory system with different types of memories (e.g., dynamic random-access memory (DRAM), non-volatile memory (NVM), high bandwidth memory (HBM), etc.), MSAs may be attached to multiple types of memories to create a memory system that allows for high bandwidth, large capacity, and low latency of memory performance. Accordingly, a multi-level memory system may include a pool of MSAs. In a system with a pool of MSAs, there may be multiple potential ways to accomplish one data operation.

For example, data may reside on an NVM. The operation to be performed on the data may be completed by the MSA that is attached to the NVM or the data may be moved to another memory and the operation may be completed by the MSA attached to the other memory. In some examples, one pathway may be more efficient than another pathway. Efficiency of a pathway may be dependent on ever-changing factors that are specific to the current state and operation of the system. Some examples of these factors include the specific function being performed, the size of the data, the distance of the data away from a specific processing resource that has to be used for a function in the data operation, etc. Thus, a system that statically assigns MSA threads without evaluating the potential ways (e.g., a system that always assigns an operation to the MSA that is closest to the data) may not allow the system to perform to its maximum potential.

Examples disclosed herein allow a computing system to evaluate potential MSA thread assignments for a data operation and select an efficient MSA thread assignment to carry out the data operation. In some examples, the computing system generates a model for every possible MSA thread assignment to accomplish a certain operation pipeline. Each model is then evaluated for cost, for example, the energy cost and execution time of each step in each model. Based on the costs, the computing system selects a cost-efficient MSA thread assignment to carry out the operation. Thus, examples disclosed herein may increase memory access and operations by dynamically selecting MSA thread assignments.

In some examples, a computing device is provided with a non-transitory machine-readable storage medium. The non-transitory machine-readable storage medium comprises instructions, that, when executed, cause a processing resource to receive an operation pipeline for a computing system. The computing system comprises at least memories and a number of memory side accelerators. The instructions, when executed, also cause the processing resource to build a graph comprising a model for a number of potential memory side accelerator thread assignments to carry out the operation pipeline. Each model may comprise a number of steps and at least one step out of the number of steps in each model comprises an operation performed at one memory side accelerator out of the number of memory side accelerators. The instructions, when executed, also cause the processing resource to determine a cost of at least one model.

In some examples, a computing device comprises a first memory, a second memory, a first memory side accelerator attached to the first memory, a second memory side accelerator attached to the second memory, a model engine, and a cost engine. The model engine is to generate a model for each potential memory side accelerator thread assignment to carry out an operation pipeline for the computing system. Each model may comprise at least one step performed by one of the first memory side accelerator and the second memory side accelerator. The cost engine is to determine a cost of at least one model.

In some examples, a method is provided, including receiving an operation pipeline for a computing system, and generating a model for each potential memory side accelerator thread assignment to carry out the operation pipeline. The computing system may comprise a first memory, a second memory, and a memory side accelerator attached to each memory. Each model may comprise a number of steps, and at least one step out of the number of steps in each model includes an operation performed by a memory side accelerator. The method also includes determining a cost of at least one model, and selecting a pathway to carry out the operation pipeline based on the cost of the at least one model.

Referring now to the figures, FIG. 1 is a block diagram of a computing device 100 with instructions thereon to generate a graph of potential memory side accelerator threads. As used herein, a "computing device" may be a server, computer networking device (e.g., switch), a storage device, chip set, desktop computer, workstation, personal device, etc., or any other processing device or equipment.

Computing device 100 includes a processing resource 101 and a machine-readable storage medium 110. Machine-readable storage medium 110 may be in the form of non-transitory machine-readable storage medium, such as suitable electronic, magnetic, optical, or other physical storage apparatus to contain or store information such as instructions 111, 112, 113, related data, and the like.

As used herein, "machine-readable storage medium" may include a storage drive (e.g., a hard drive), flash memory, Random Access Memory (RAM), any type of storage disc (e.g., a Compact Disc Read Only Memory (CD-ROM), any other type of compact disc, a DVD, etc.) and the like, or a combination thereof. In some examples, a storage medium may correspond to memory including a main memory, such as a Random Access Memory, where software may reside during runtime, and/or a secondary memory. The secondary memory can, for example, include a non-volatile memory where a copy of software or other data is stored.

In the example of FIG. 1, instructions 111, 112, and 113, are stored (e.g., encoded) on storage medium 110 and are executable by processing resource 101 to implement functionalities described herein in relation to FIG. 1. In some examples, the functionalities of any of the instructions of storage medium 110 may be implemented in the form of electronic circuitry, in the form of executable instructions encoded on machine-readable storage medium, or a combination thereof.

Processing resource 101 may, for example, be in the form of a central processing unit (CPU), a semiconductor-based microprocessor, a digital signal processor (DSP) such as a digital image processing unit, or other hardware devices or processing elements suitable to retrieve and execute instructions stored in a storage medium, or suitable combinations thereof. The processing resource can, for example, include single or multiple cores on a chip, multiple cores across multiple chips, multiple cores across multiple devices, or suitable combinations thereof. The processing resource can be functional to fetch, decode, and execute instructions 111, 112, and 113 as described herein.

Instructions 111 may be executable by processing resource 101 such that computing device 100 receives an operation pipeline for a computing system. As used herein, an "operation pipeline" includes and/or represents a computational function performed on data by a processing resource. In some examples, the operation pipeline may be received in the format of high-level commands (e.g., sent by a client-side application in a programming language such as C language) that may be carried out by the computational functions. In these examples, instructions 111 may include instructions to translate these high-level commands into low-level commands (i.e. instructions understood by a processing resource). In some examples, the operation pipeline may be received in the format of low-level commands. Non-limiting computational functions (represented herein by their high level command) include image to column (im2col), general matrix to matrix multiplication (GEMM), filtering functions, scattering functions, etc. An operation pipeline is not limited to a specific number of functions. For example, an operation pipeline may have one function or it may have at least one function (e.g., two functions, three functions, etc.) In examples where an operation pipeline has or is represented by at least one function, the output of a first-occurring function is the input of the second-occurring function and the output of the second-occurring function is the input of the third-occurring function, etc. As used herein, "a computing system" may include at least one computing device (including at least two computing devices). In examples, where the computing system includes at least two computing devices, the at least two computing devices may be communicatively connected to each other through a communication network to exchange data, commands, and information. In some examples, the communication network may be a wireless network, a wired network, or a combination thereof. In some examples, the communication network may be an individual network or a collection of many such individual networks interconnected with each other and functioning as a single large network (e.g., the Internet or an intranet). In some examples, the communication network may be implemented as a local area network (LAN), wide area network (WAN), etc.

Thus, in some examples, computing device 100 may receive an operation pipeline from a client-side application (not shown in FIG. 1) that is communicatively connected to computing device 100. Additionally, in other examples, computing device 100 may receive the operation pipeline from other components of computing device 100 (e.g., other instructions encoded on machine-readable storage medium that are not shown in FIG. 1).

The computing system for the operation pipeline comprises at least two memories (e.g., two memories, three memories, etc.) In some examples, the memories may be the same type. In some examples, the memories may be different types. As used herein, one memory is a "different type" from another memory because it has different characteristics (e.g., capabilities and/or structure, etc.). Some differentiating characteristics include a memory's ability to store information after having been power cycled, a memory's access speed to data stored on the memory, a memory's physical medium, etc. For example, non-volatile memory (NVM) is a different type of memory from random access memory (RAM) because non-volatile memory retains stored information after being power cycled whereas RAM does not retain information after being power cycled. As another example, dynamic random-access memory (DRAM) is a different type of memory than static random-access memory (SRAM) because SRAM comprises a six transistor memory cell whereas DRAM memory comprises transistor and capacitor pair. Thus, in some examples, memories that fall into the same broad category may be considered to be of different types due to differentiating characteristics (for example, flash memory and magnetic tape which may both be categorized as NVM but may be different types of memories). In some examples, the computing system may comprise two memories of the same type which are placed in the computing system at different hierarchies (e.g. in a multi-level memory system).

The computing system may also have a number of memory side accelerators. As used herein, a memory side accelerator includes a programmable hardware that is capable of executing at least a portion of the operation pipeline. The memory side accelerator is directly connected to the memory and is located at a physical location that is closer to the memory relative to a central processing unit of the computing system. Accordingly, the memory side accelerator may interface with the memory and perform instructions or functions represented in the operation pipeline. In some examples, the memory side accelerator may be implemented by an application specific integrated circuit (ASIC) that is configured to handle at least one application specific function. In some examples, the memory side accelerator may be implemented by a field-programmable gate array (FPGA) to handle a specific function. In some examples, the memory side accelerator may be implemented by an FPGA that is programmed on-the-fly to handle an incoming function. In some examples, an MSA may include at least one programmable core.

As used herein, a "number" may refer to one, two, three, etc. Thus, a computing system may have two memory side accelerators. In such a computing system, "a number" equals two. As another example, a computing system may have three memory side accelerators. In this example, "a number" equals three. In some examples, the computing system may have a memory side accelerator attached to each memory that it has. For example, the computing system may have two non-volatile memories, and three dynamic random access memories. The computing system may have five memory side accelerators, with one memory side accelerator attached to each memory. Accordingly, a computing system may have different locations at which the operation pipeline may be carried out.

Instructions 112 may be executable by processing resource 101 such that computing device 100 builds a graph comprising a model for a number of potential memory side accelerator thread assignments to carry out the operation pipeline. Because the operation pipeline received by instructions 111 may be carried out by different memory side accelerators, instructions 112 may map out the different ways the operation pipeline may be carried out in models. One operation pipeline may have a number of different potential thread assignments to carry out the operation pipeline (e.g., four potential assignments) and another operation pipeline may have a different number of different potential thread assignments to carry out the operation pipeline (e.g., ten potential assignments). Thus, a model may be a recipe for carrying out the operation pipeline, including the function that is to be performed and the location (e.g., medium) at which the function is performed. A model may also include steps that describe the movement of data from one location to another location. Each model of a potential thread assignment may comprise a number of steps and at least one step out of the number steps in each model may comprise a function that is performed at one memory side accelerator out of the number of memory side accelerators. For example, a computing system may comprise non-volatile memory A with attached MSA, random access memory B with attached MSA, and a central processing unit. The operation pipeline received for the computing system may comprise performing function 1 on data Y. Data Y may be located in non-volatile memory A. One location where function 1 may be performed is at non-volatile memory A by the MSA attached to non-volatile memory A. Another location where function 1 may be performed is at random access memory B by the MSA attached to random access memory B. Thus, the graph for the operation pipeline may include two models. The first model may comprise one step: perform function 1 on data Y at MSA attached to non-volatile memory A. The second model may comprise two steps: move data Y from non-volatile memory A to random access memory B, and perform function 1 on data Y at MSA attached to random access memory B. For a more complicated computing system, the models may be numerous. As an example, an operation pipeline for a multi-level rack computing system may comprise of hundreds of potential MSA thread assignments, each with its own number of steps. To tailor thread assignments for the computing system, computing device 100 has knowledge about the architecture and capabilities of the computing system for the operation pipeline. For example, computing device 100 knows how many memories and the capabilities of the number of memory side accelerators that the computing system has.

Instructions 113 may be executable by processing resource 101 such that computing device 100 determines a cost of at least one model out of the models that are generated by instructions 112. In some examples, a "cost" of a model may comprise an energy consumption for executing the model. In other examples, a "cost" of a model may comprise an execution time for performing the model. In yet other examples, a "cost" of a model may be a weighted combination of both the energy consumption and the execution time of the performing the model.

In some examples, a cost of a model may be determined by evaluating the cost for least one step in the model. This at least one step may be the step that includes the step performed by the MSA. In some examples, a cost of a model may be determined by evaluating the cost of each step of the model and adding the cost of each step in the model. The cost of a step in a model may be determined using statistical models that are expressed by mathematical equations. These equations may rely on previous iterations of similar steps in similar operation pipelines and may also vary depending on the type of memory and/or type of MSA that is being utilized. Some inputs that may be used in these equations are the size of the input data on which the function is to be performed, the network bandwidth between memories that the data is transferred to and from (e.g., bandwidth between NVM and DRAM), the floating-point operations per second (FLOPS) of the MSA, the power consumption of the components involved in each step, etc.

In some examples, instructions 113 may include instructions executable by processing resource 101 such that computing device 100 determines a cost of each model that is generated. Accordingly, this may include determining a cost of at least one step in each model (including determining a cost of each step in each model).

In some examples, computing device 100 may include instructions executable by processing resource 101 such that computing device selects a pathway out of the models to carry out the operation pipeline based, at least in part, on the cost of the models. For example, an operation pipeline may have two models that are generated: model 1 and model 2. Model 1 may have an energy consumption less than model 2 but may take more time to execute than model 2. In examples where energy consumption is more important than execution time, model 1 may be selected as the pathway to carry out the operation pipeline. In examples where execution time is more important than energy consumption, model 2 may be selected as the pathway to carry out the operation pipeline. In some examples, the importance of energy consumption versus execution time may be configurable by an administrator of computing device 100 or the computing system.

As discussed above, an operation pipeline may have hundreds of potential MSA thread assignments (for example, when computing system is a rack-scale data center with multiple memories and multiple attached MSAs). In these examples, hundreds of models may be generated and the time it may take to determine the cost of each model (and the steps in each model) may be extensive, delaying the selection of the pathway described above. Accordingly, in some examples, computing device 100 may include instructions executable by processing resource 101 such that computing device 100 filters out the models of the number of potential MSA thread assignments to identify at least one candidate model. As used herein, a candidate model includes a model of a potential MSA thread assignment that was generated that is to be investigated further as a selected pathway to carry out the operation pipeline. In other words, a candidate model may be a model that is predicted to be an efficient pathway to accomplish the operation pipeline. While an operation pipeline may have hundreds of models, one for each potential MSA thread assignment, an operation pipeline may have fewer candidate models. The fewer candidate models may decrease the time it takes to determine the cost of the models as there are fewer models to evaluate.

In some examples, the at least one candidate model may be determined via a neural network. The neural network may use certain characteristics associated with the operation pipeline or computing system to filter the models to determine the least one candidate model. Non-limiting examples of characteristics include bandwidth requirement, CPU requirement, frequencies of the CPU and MSAs, power consumption of each component of the computing system, etc. In some examples, the neural network may use historical data of previous operation pipelines to determine a candidate model for a current operation pipeline. For example, previous operation pipeline A may have required an $X_A$ amount of bandwidth and a $Y_A$ CPU utilization, previous operation pipeline B may have required $X_B$ amount of bandwidth and a $Y_B$ CPU utilization, and previous operation pipeline C may have required $X_C$ amount of bandwidth and a $Y_C$ CPU utilization. For each previous operation pipeline A-C, a most efficient MSA thread assignment is known. Based on the association of those previous inputs and the most efficient thread assignment for the previous operation pipelines, a determination can be made about candidate models for a current operation pipeline based on the current operation pipeline's characteristics. Using statistical equations, the characteristics of the operation pipeline may be estimated. Some inputs that may be used in these equations are the size of the input data on which the function is to be performed, the network bandwidth between memories that the data is transferred to and from (e.g., bandwidth between NVM and DRAM), the floating-point operations per second (FLOPS) of the MSA, the power consumption of the components involved in each step, etc. Thus, for example, a required bandwidth and a CPU utilization for a current operation pipeline may be estimated using those statistical equations. Using the estimated required bandwidth and estimated CPU utilization and the historical data available in the neural network, at least one candidate model may be determined (including one candidate model, two candidate models, three candidate models, etc.) Accordingly, computing device 100 may include a storage medium to store the historical data for the neural network. In examples where at least one candidate model is determined, the at least one model for which a cost is determined by processing resource 101 with regard to instruction 113 is the at least one candidate model. Accordingly, determining at least one candidate model may lessen the amount of models that are evaluated for cost. Thus, in selecting a pathway to carry out the operation pipeline, only the candidate models are evaluated instead of the entirety of models.

In some examples, machine-readable storage medium 110 may further include instructions to assign the selected pathway to the memory side accelerators used in the selected pathway. In some examples, this may include compiling the operation pipeline into lower level commands and transmitting the lower level commands to the memory side accelerators in the selected pathway. In some examples, this may include sending high level commands (e.g., source code) to the memory side accelerators in the pathway. The memory side accelerators may compile the high level commands and translate it to lower level commands understood by the memory side accelerator.

Figure 2:
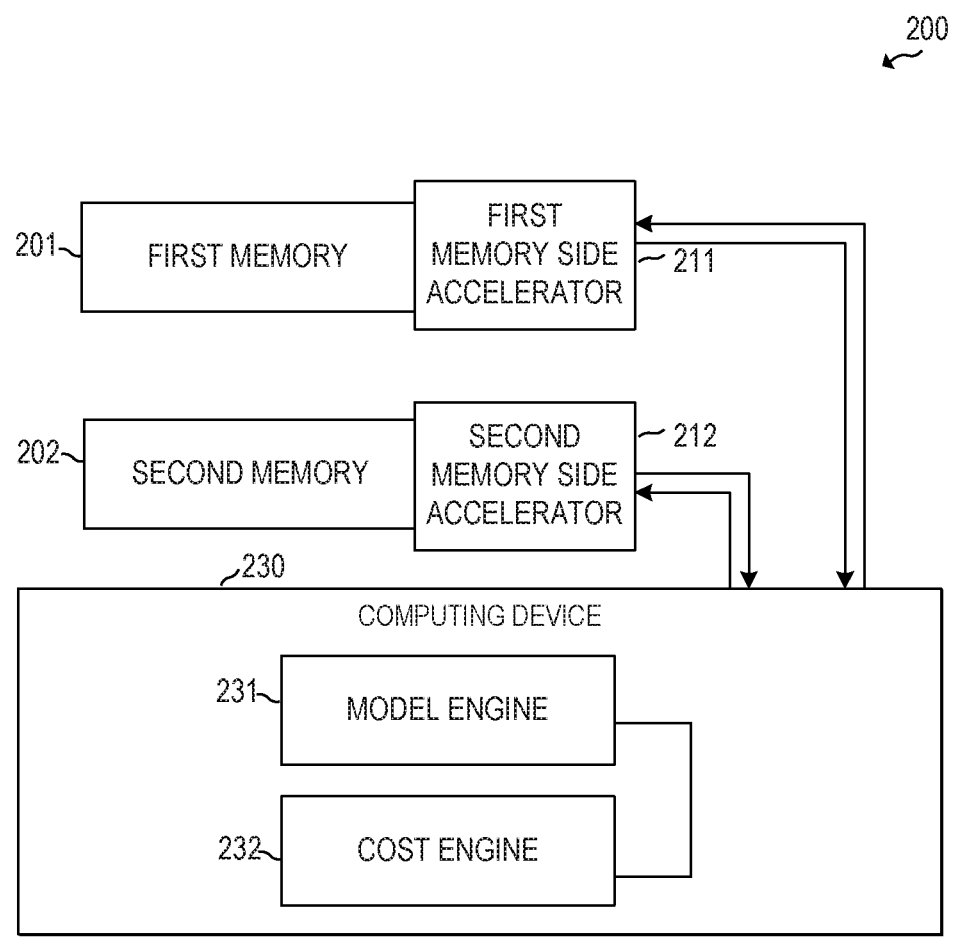
FIG. 2 is a block diagram of a computing system to determine a cost of a potential memory side accelerator thread assignment, according to some examples.

Computing device 100 of FIG. 1, which is described in terms of processors and machine readable storage mediums, may include one or more structural or functional aspects of computing system 200 of FIG. 2 or computing system 300 of FIG. 3, which are described in terms of engines containing hardware and software.

FIG. 2 is a block diagram of a computing system 200 to determine a cost of a potential memory side accelerator thread. As discussed above, computing system 200 may include multiple computing devices that are connected by a communication network. These computing devices may include a first memory side accelerator 211 attached to a first memory 201, a second memory side accelerator 212 attached to a second memory 202, and a computing device 230. While first memory side accelerator 211 and first memory 201 are shown as being separate from second memory side accelerator 212 and second memory 202, in other examples, first memory side accelerator 211 and first memory 201 are housed with second memory side accelerator 212 and second memory 202. Additionally, while first memory side accelerator 211, first memory 201, second memory side accelerator 212, and second memory 202 are shown as being separate from computing device 230, in other examples, one of or both of first memory side accelerator 211 and first memory 201, second memory side accelerator 212 and second memory 202 are housed with computing device 230.

In some examples, first memory 201 is different from second memory 202. The discussion above regarding "different type" with regard to FIG. 1 is applicable here. Thus, in some examples, first type of memory 201 may be a non-volatile memory and second type of memory 202 may be a random access memory. First memory 201 and second memory 202 may be implemented by other types of memories without departing from examples described herein. For example, first memory 201 and second memory 202 may be of the same type. First memory side accelerator 211 is attached to first memory 201. As used herein, "attached" includes being physically and directly connected to the memory at a location that is near or on the memory. This nearby, direct connection may allow for accelerated data operations by decreasing the movement of data through connective fibers or signals in the communication network, etc. In some examples, first memory side accelerator 211 may be similar to second memory side accelerator 212 in that they have the same structure, capabilities, etc. In other examples, first memory side accelerator 211 may be different from second memory side accelerator 212. For example, first memory side accelerator may be able to perform certain application-specific functions that second memory side accelerator 212 is unable to perform and vice versa. While computing system 200 is shown with two memories and two memory side accelerators, one attached to each memory, computing system 200 is not limited to the number of memories and memory side accelerators shown.

Computing device 230, like computing device 100, may be a server, computer networking device, chip set, desktop computer, workstation, personal device, or any other processing device or equipment. Computing device 230 includes a model engine 231, and a cost engine 232. Each of these aspects of computing device 230 will be described below. Other engines may be added to computing device 230 for additional or alternative functionality. Computing device is communicatively connected to first memory 201 and first memory side accelerator 211 and second memory 202 and second memory side accelerator 212 via the communication network.

Each of engines 231 and 232 and any other engines, may be any combination of hardware (e.g., a processor such as an integrated circuit or other circuitry) and software (e.g., machine or processor-executable instructions, commands, or code such as firmware, programming, or object code) to implement the functionalities of the respective engine. Such combinations of hardware and programming may be implemented in a number of different ways. A combination of hardware and software can include hardware (i.e., a hardware element with no software elements), software hosted on hardware (e.g., software that is stored in a memory and executed or interpreted by a processor), or by hardware and software hosted on hardware. Additionally, as used herein, the singular forms "a," "an," and "the" include plural referents unless the context clearly dictates otherwise. Thus, for example, the term "engine" is intended to mean at least one engine or a combination of engines. In some examples, computing device 230 may include additional engines, like some of the engines discussed in relation to computing device 330.

Each engine of computing device 230 can include at least one machine-readable storage mediums (for example, more than one) and at least one processing resource (for example, more than one). For example, software that provides the functionality of engines on computing device 230 can be stored on a memory of a computer to be executed by a processing resource of the computer. In some examples, each engine of computing device 230 may include hardware in the form of a microprocessor on a single integrated circuit, related firmware, or other software for allowing the microprocessor to operatively communicate with other hardware of computing device 230.

Model engine 231 is an engine of computing device 230 that includes a combination of hardware and software that allows computing device 230 to generate a model for each potential memory side accelerator thread assignment to carry out an operation pipeline for the computing system 200. In some examples, each model comprises at least one step that is performed by either the first memory side accelerator 211 or the second memory side accelerator 212. In some examples, some models may comprise one step that is performed on one memory side accelerator and another step that is performed on the other memory side accelerator.

The operation pipeline may come from another computing device in computing system 200 (not shown), a client-side application from an external network (not shown), or from computing device 230 itself. Model engine 231 may have knowledge regarding the architecture of computing system 200, including what kind of memories first memory 201 and second memory 202 are and the individual capabilities of first memory side accelerator 211 and second memory side accelerator 212. Based on the knowledge of computing system 200 and the operation pipeline, model engine 231 may determine which function in the operation pipeline may be performed where. For example, in an operation pipeline with a GEMM function, model engine 231 may determine that the capabilities of the first memory side accelerator 211 and the second memory side accelerator 212 are both unable to perform this function and that this function is to be performed on another processing resource of computing system 200 (e.g., a central processing unit). Accordingly, in each model generated by model engine 231, the function of the GEMM would not be located on the first memory side accelerator 211 or the memory side accelerator 212.

Cost engine 232 is an engine of computing device 230 that includes a combination of hardware and software that allows computing device 230 to determine a cost of at least one model. In some examples, a cost of a model may be based on an energy consumption for that model. In some examples, a cost of a model may be based on an execution time for that model. A cost of a model may be based on the cost of at least one step in the model (e.g., the cost of one step, the cost of two steps added together, the cost of three steps added together, all of the steps added together, etc.) In some example, the cost of a model may be based on the cost of a representative step. For example, the most time consuming step or the most energy consuming step may be considered the cost of the model. As discussed above, the cost of a step may be determined using predictive equations based on previous iterations of similar functions performed at similar locations. Accordingly, a predictive equation for an MSA attached to one memory may be different for a predictive equation for an MSA attached to another memory due to memory and MSA capabilities.

In some examples, cost engine 232 may allow computing device 230 to determine the cost of every model that is generated by model engine 231 for the operation pipeline. Cost engine 232 may select a pathway to carry out the operation pathway based on, at least in part, the comparison of the cost of each model.

In some examples, however, an operation pipeline may have numerous potential MSA thread assignments, and accordingly, numerous models. In these examples, the time it may take to determine the cost of each model and the steps in each model may be extensive. Thus, cost engine 232, in these examples, may allow computing device 230 to determine at least one candidate model out of the models that are generated. Accordingly, the numerous models may be filtered down to one, two, three, etc. candidate models. Cost engine 232 may then determine the cost of the candidate models. This decreases the time it takes to evaluate the models and may allow for faster selection of a pathway to carry out the operation pipeline.

In some examples, cost engine 232 may comprise a neural network architecture. The neural network may use certain characteristics associated with the operation pipeline or computing system to determine the at least one candidate model. Non-limiting examples of characteristics include bandwidth requirement, CPU requirement, frequencies of the CPU and MSAs, power consumption of each component of the computing system, etc. In some examples, the neural network may use historical data of previous operation pipelines to determine a candidate model for a current operation pipeline. The previous operation pipelines are associated with certain characteristics. The previous operation pipelines are also associated with MSA assignment threads that were selected for the previous operation pipeline because they were most efficient assignments for the previous operation pipeline. Accordingly, the neural network may associate certain characteristics of an operation pipeline with certain candidate models. Using this, a candidate model for a current operation model may be determined. Thus, for example, a required bandwidth and a CPU utilization for a current operation pipeline may be estimated using statistical equations. Using those estimated required bandwidth and CPU utilization and the historical data available in the neural network, at least one candidate model may be determined (including one candidate model, two candidate models, three candidate models, etc.) Accordingly, cost engine 232 may include or may be communicatively connected to a storage medium (e.g., non-volatile memory) to store historical data for the previous operation pipeline.

FIG. 3 is a block diagram of a computing system 300 to determine a cost of potential memory side accelerator thread assignments in the computing system. As discussed above, computing system 300 may include multiple computing devices that are connected by a communication network. Computing system 300 is shown as a rack-scale data center with multi-level memory modules and includes multiple non-volatile memories 301A, 301B, 301C, and 301D. Each non-volatile memory 301A, 301B, 301C, 301D is attached to a memory side accelerator 311A, 311B, 311C, and 311D, respectively. Computing system 300 may also comprise a switch 320, computing device 330A, and computing device 330B. Switch 320 may route and transmit data to and from non-volatile memories 311A-311D and computing devices 330A-330B. Accordingly, computing devices 330A-330B may individually access the data stored in any one of non-volatile memory 301A-301D. Additionally, computing device 330A and computing device 330B may also be communicatively connected via switch 320.

Computing device 330A comprises a model engine 331, a cost engine 332, a communication engine 333, dynamic random access memory 302, and a memory side accelerator 312 attached to dynamic random access memory 302. Dynamic random access memory 302 may be characterized as a different type of memory from non-volatile memory 301A-301D. Accordingly, computing system 300 has different types of memories. Additionally, while non-volatile memory 301A-301D are all non-volatile memories, they may be different types of memories from each other as well. While FIG. 3 shows certain types of memories associated with computing system 300, computing system 300 is not limited to the types of memories shown. For example, dynamic random access memory 302 may be a static random access memory instead. Additionally, computing system 300 may have a similar types of memories. For example, non-volatile memory 301A-301D may be DRAM.

Model engine 331 is similar to model engine 231 and the description of model engine 231 is applicable here. Cost engine 332 is similar to cost engine 222 and thus, the description of model engine 222 is applicable here.

Communication engine 333 is an engine of computing device 330A that includes a combination of hardware and software that allows computing device 330A to communicate to an external communication network. In some examples, communication engine 333 allows computing device 330A to receive an operation pipeline for computing system 300 from the external communication network. For example, an external communication network may allow computing device 330A to receive an operation pipeline from a client-side application. Accordingly, in some examples, the operation pipeline may come from the external network. In other examples, the operation pipeline may come from other components of computing device 330A. In yet other examples, the operation pipeline may come from other components of computing system 300 (e.g., computing device 330B).

In some examples, computing device 330B may be similar to computing device 330A in that it has its own dynamic random access memory 320 attached to a memory side accelerator 312 and its own communication engine 333, model engine 331, and cost engine 332 (not shown in FIG. 3). In these examples, computing device 330B may generate models and determine costs for the operation pipelines that are received by computing device 330B or generated by computing device 330B. In other examples, computing device 330B may comprise a dynamic random access memory 302 attached to a memory side accelerator 312, and a communication engine 333, but may not comprise a model engine 331 or a cost engine 332. In these examples, computing device 330A may generate models and determine costs for the operation pipelines received and/or generated by computing device 330A and/or computing device 330B. While computing system 300 is shown with a specific number of memories, memory side accelerators, switches, and computing devices, computing system 300 is not limited to the number of memories, memory side accelerators, switches, and computing devices shown.

FIGS. 4A and 4B show diagrams of two different potential MSA thread assignments 400A and 400B, respectively, for one operation pipeline. In FIGS. 4A and 4B, the operation pipeline may comprise a filtering function on data that is located on non-volatile memory 401 and then another function that may only be completed on a specific processing resource (e.g., a central processing unit) of a computing device. As discussed above, this may be because the other function may require processing capabilities that MSA 411 and MSA 412 do not possess. In potential MSA thread assignment 400A, the first step may be locating the data in non-volatile memory 401. This is represented by the numeral 1 in the arrow diagram. The filtering function is accomplished by MSA 411 that is attached to non-volatile memory 401 (numeral 2 in the arrow diagram). The filtered data is then moved to dynamic random access memory 402 (numeral 3 in the arrow diagram), where the specific processing resource may access the filtered data. In potential MSA thread assignment 400B, the original data (numeral 1) is moved from non-volatile memory 401 to dynamic random access memory 402 (numeral 2). The filtering function is performed by MSA 412 attached to dynamic random access memory 402 (numeral 3). The filtered data is then accessible by the specific processing resource.

Because the operation pipeline comprises a filtering function, potential MSA assignment thread 400A may be faster and require less energy than potential MSA assignment thread 400B. This is because the filtering function is performed by the MSA that is nearest to the original location of the data. Additionally, the data that is moved to dynamic random access memory 402 is smaller in size than the original data. In other examples, however, potential MSA assignment thread 400B may require less energy and less execution time than potential MSA assignment thread 400A. For example, the first function in the operation pipeline may be an image to column function. This function creates more data than the original data. Thus, 400B allows the original, smaller data to be moved from non-volatile memory 401 to dynamic random access memory 402. With 400A, however, the function is performed in MSA 411, and the larger data would be moved from non-volatile memory 401 to dynamic random access memory 402. Accordingly, potential MSA assignment thread 400A may require more energy and time to execute than potential MSA assignment thread 400B in those examples.

Describing potential MSA assignment threads 400A and 400B in the context of computing system 300, model engine 331 of computing system 300 generates two models, one for each potential MSA thread assignment thread. Cost engine 332 may determine the cost of each step (numerals 1-3) and select a pathway to carry out the operation pipeline based on the cost.

Figure 5:
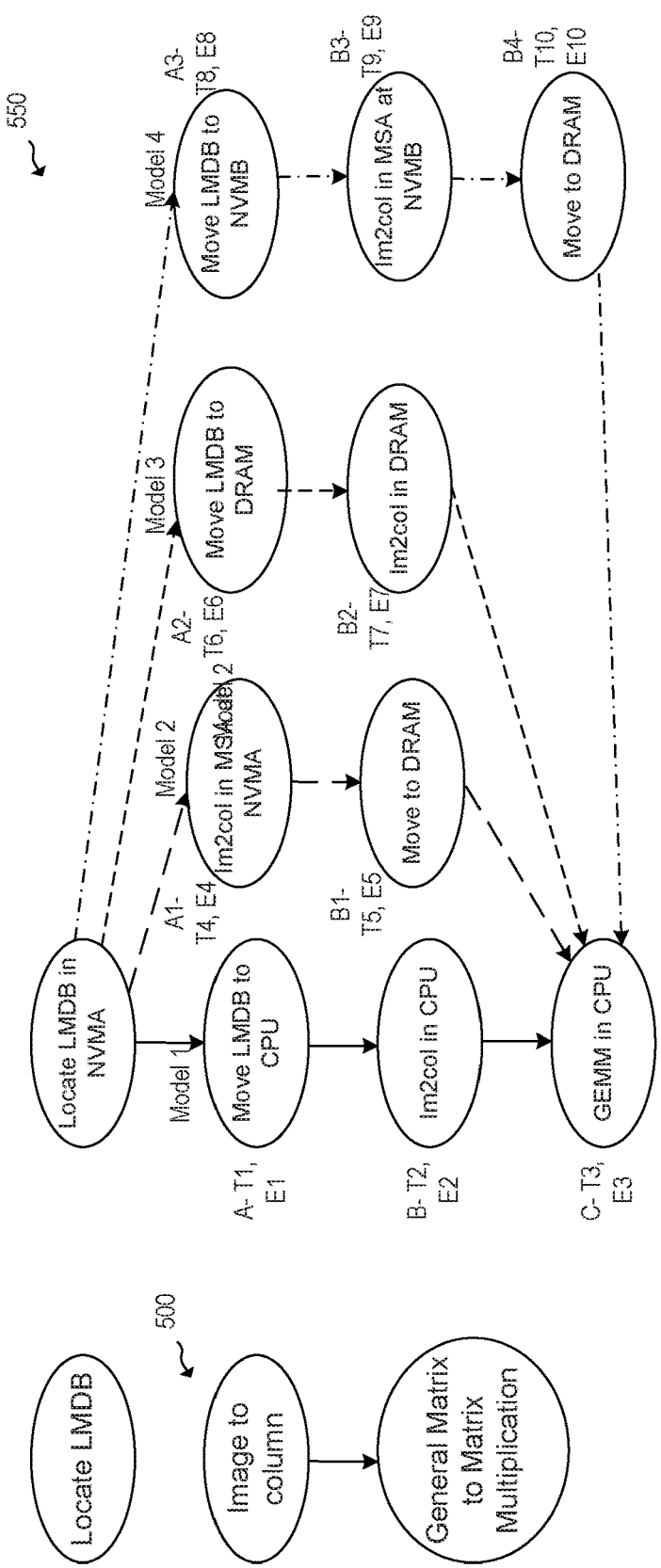
FIG. 5 is a diagram of an operation pipeline and a graph comprised of models of potential memory side accelerator thread assignments to carry out the operation pipeline, according to some examples.

FIG. 5 is a diagram of an operation pipeline 500 and a graph 550 comprised of models of potential MSA assignment threads to carry out the operation pipeline 500. Operation pipeline 500 may comprise two functions: 1) performing an image to column function on the data LMDB, and 2) performing a GEMM function on the output of function 2. Describing FIG. 5 in the context of computing system 300, communication engine 333 may receive operation pipeline 500 and model engine 331 of computing system 300 may generate graph 550. FIG. 5 shows four models, however, FIG. 5 is a non-limiting illustrative example of a graph and may or may not show all models that may be generated for operation pipeline 500 in the context of computing system 300.

The flow of each model in FIG. 5 is represented by arrows of different dotted patterns. Model 1 may include steps A, B, and C. Model 2 may include steps A1, B1, and C. Model 3 may include steps A2, B2, and C. Model 4 may include A3, B3, B4, and C. Each model includes step C because model engine 331 may determine that the function GEMM may only be performed by a specific central processing unit on a specific computing device and not any of the MSA attached to any of the memories (e.g. central processing unit in computing device 330A, not shown in FIG. 3).

Model 1 uses the specific central processing unit and does not use any MSA to perform the functions in the operation pipeline. In A, the LMDB data, which is originally located in NVMA 301A, is moved to DRAM 302 (which is accessible by the specific central processing unit). The energy required for the step is E1. The execution time for step A is T1. In B, the image to column function is performed by the central processing unit. The energy required for that step is E2. The execution time for step B is T2. In C, the GEMM function is also performed by the central processing unit. The energy required for that step is E3. The execution time for step C is T3. Accordingly, the cost for model 2 may be T1, T2, and T3 and/or E1, E2, and E3.

With model 2, at A1, the image to column function is performed by MSA 311A attached to NVMA 301A. The energy required for that step is E4. The execution time for step A1 is T4. At B1, the altered data is moved to DRAM 302 (which is accessible by the specific central processing unit). The energy required for that step is E5. The execution time for step B1 is T5. In C, the GEMM function is performed by the central processing unit. The energy required for that step is E3. The execution time for step C is T3. Accordingly, the cost for model 2 may be T4, T5, and T3 and/or E4, E5, and E3.

With model 3, at A2, the original data in NVMA is moved to the DRAM 302. The energy required for that step is E6. The execution time for step A2 is T6. At B2, the image to column function is performed by MSA 312 attached to DRAM 302. At C, the GEMM function is performed by the central processing unit, which also has access to DRAM 302. The energy required for that step is E3. The execution time for step C is T3. Accordingly, the cost for model 3 may be T6, T7, and T3 and/or E6, E7, and E3.

With model 4, at A3, the original data in NVMA 301A is moved to the NVMB 301B. The energy required for that step is E8. The execution time for step A3 is T8. This movement may be contemplated because NVMB 301B may be physically closer to the specific central processing unit than NVMA 301A. At B3, the image to column function is performed by MSA 311B. The energy required for that step is E9. The execution time for step B4 is T9. At B4, the altered data is moved to DRAM 302. The energy required for that step is E10. The execution time for step B4 is T10.

At C, the GEMM function is performed by the central processing unit, which also has access to DRAM 302. The energy required for that step is E3. The execution time for step C is T3. Accordingly, the cost for model 4 may be T8, T9, T10, and T3 and/or E8, E9, E10, and E3.

Figure 6:
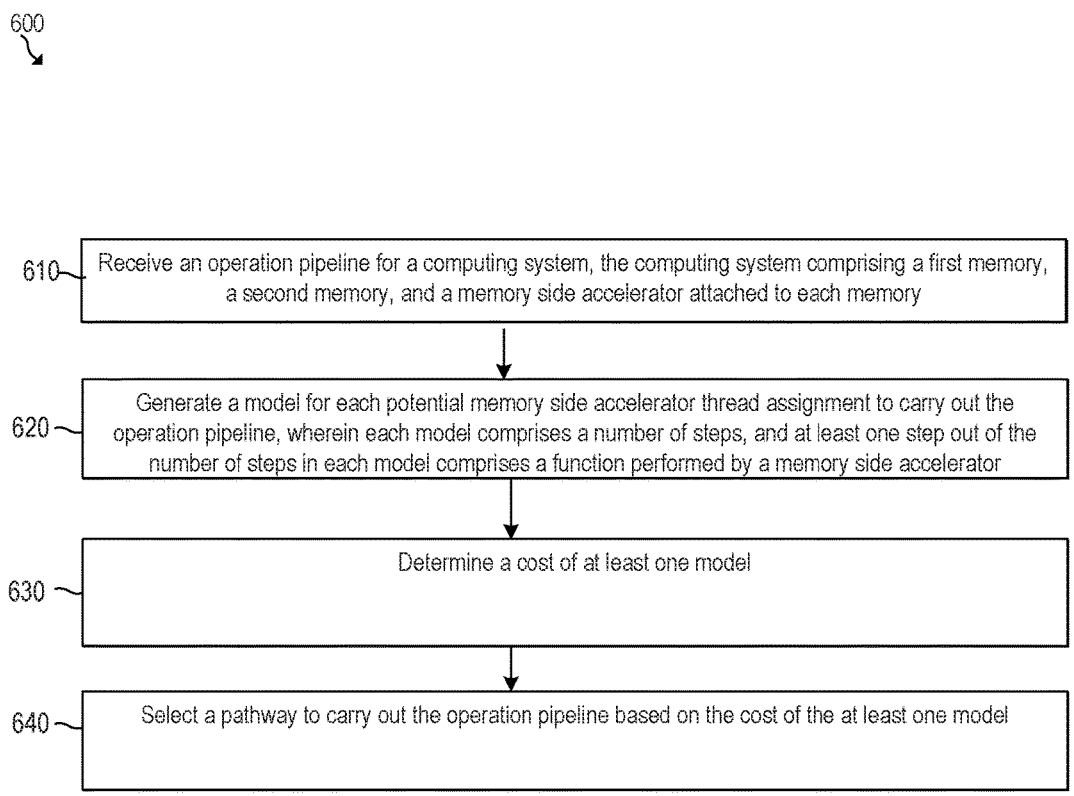
FIG. 6 is a flowchart of a method of determining a cost of a potential memory side accelerator thread assignment, according to some examples.

FIG. 6 illustrates a flowchart for a method 600 to determine a cost of a potential memory side accelerator thread assignment. Although execution of method 600 is described below with reference to computing device 100 of FIG. 1, other suitable systems for execution of method 600 may be utilized (e.g., computing system 100 or computing system 300). Additionally, implementation of method 600 is not limited to such examples and it is appreciated that method 600 may be used for any suitable device or system described herein or otherwise.

At 610 of method 600, processing resource 101 may execute instructions 111 to receive an operation pipeline for a computing system. The computing system may comprise a first memory, a second memory, and a number of memory side accelerators. In some examples, the number of memory side accelerators may include a memory side accelerator attached to each memory. At 620 of method 600, processing resource 101 may execute instructions 112 to generate a model for each potential memory side accelerator thread assignment to carry out the operation pipeline. Processing resource 101 may also generate a graph that comprises these models. Each model may comprise a number of steps and at least one step out of the number steps in each model may comprise a function performed by a memory side accelerator. At 630 of method 600, processing resource 101 may execute instructions 113 to determine a cost of at least one model that was generated at 620. As discussed above, in some examples, a cost of a model may be the execution time of a model or at least one step in the model. In other examples, a cost of a model may be the energy consumption required to perform the model or at least one step in the model. Additionally, as discussed above, in some examples, computing device 100 may include instructions to select a pathway to carry out the operation pipeline. Thus, at 640, processing resource 101 may execute those instructions to select a pathway. The selection may be based on, at least in part, the cost of the at least one model.

Although the flowchart of FIG. 6 shows a specific order of performance of certain functionalities, method 600 is not limited to that order. For example, some of the functionalities shown in succession may be performed in a different order, may be executed concurrently or with partial concurrence, or a combination thereof. In some examples, functionalities described herein in relation to FIG. 6 may be provided in combination with functionalities described herein in relation to any of FIGS. 1-5, and 7.

Figure 7:
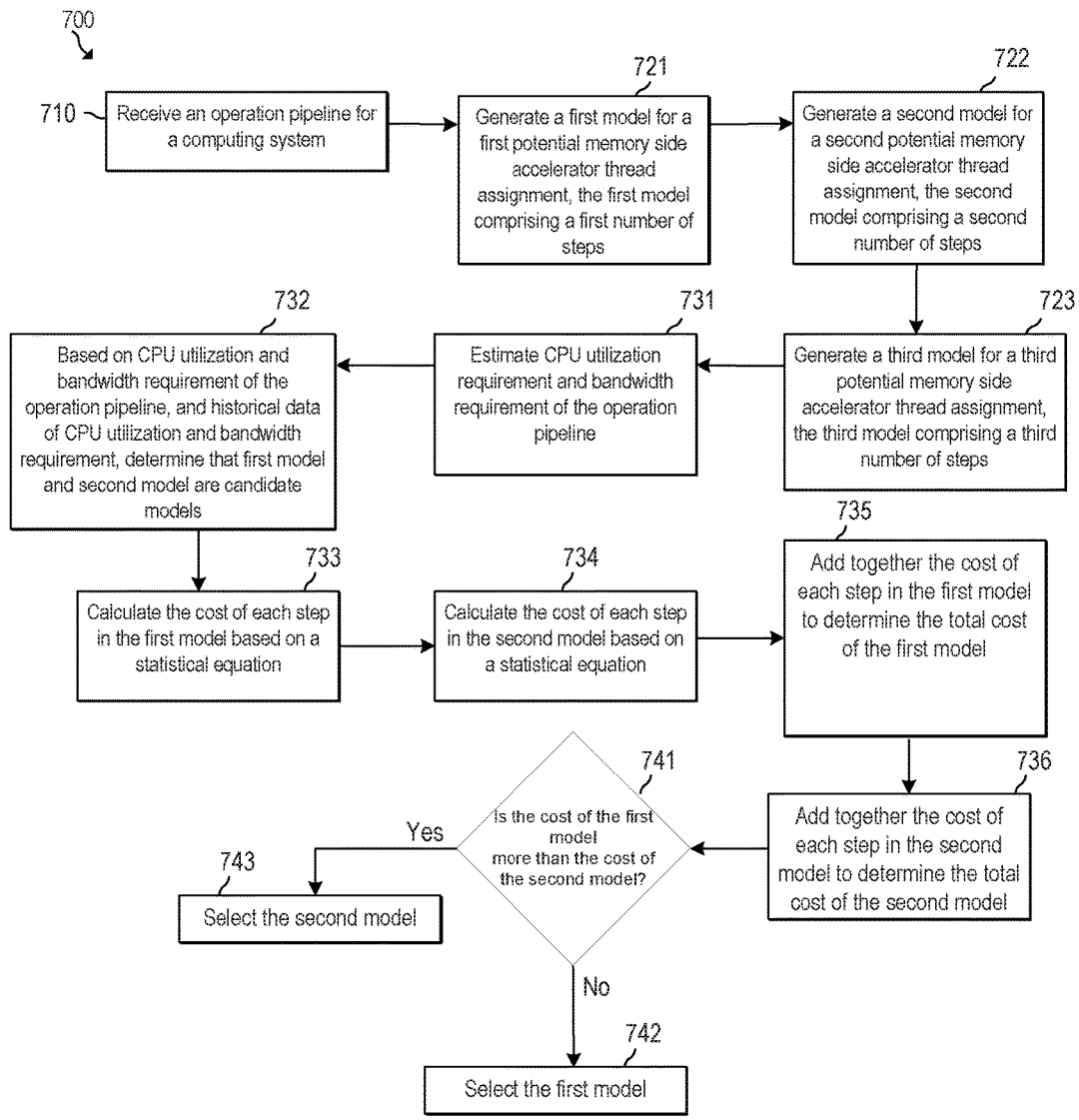
FIG. 7 is a flowchart of a method of selecting a pathway to carry out an operation pipeline, according to some examples.

FIG. 7 illustrates a flowchart of a method of selecting a pathway to carry out an operation pipeline, according to some examples. Although execution of method 600 is described below with reference to computing system 300 of FIG. 3, other suitable systems for execution of method 700 may be utilized (e.g., computing system 100 or computing system 200). Additionally, implementation of method 700 is not limited to such examples and it is appreciated that method 700 may be used for any suitable device or system described herein or otherwise.

At 710 of method 700, communication engine 333 receives an operation pipeline for computing system 300. Communication engine 333 communicates this operation pipeline to model engine 331. At 721, model engine 331 generates a first model for a first potential side accelerator thread assignment to carry out the operation pipeline received at 710. The first model may comprise a first number of steps. At 722, model engine 331 generates a second model for a second potential memory side accelerator assignment thread to carry out the operation pipeline received at 710. The second model may comprise a second number of steps. At 723, model engine 331 generates a third model for a third potential memory side accelerator thread assignment to carry out the operation pipeline received at 710. The third model may comprise a third number of steps. As discussed above, in some examples, each of the first, second, and third model may include a step that is performed at one of the memory side accelerators in computing system 300. In other examples, however, at least one of the generated model may include a step that is performed at one of the memory side accelerators in computing system 300 (for example, one model may comprise only steps that are performed at a central processing unit, etc., as discussed in relation to FIG. 5.) At 731, cost engine 332 estimates the CPU utilization requirement and bandwidth requirement of the operation pipeline received at 710. As discussed above, these requirements are characteristics associated with the operation pipeline and may be estimated by statistical equations based on historical data of past operation pipelines. At 732, cost engine 332 may determine candidate models out of the generated models in 721, 722, and 723. As discussed above, cost engine 332 may determine these candidate models based on the estimated CPU utilization requirement, bandwidth requirement of the operation pipeline, (at 731) and a neural network based on previous operation pipelines and the characteristics associated with those operation pipelines. Based on this, cost engine 332 may determine that the first model and the second model are candidate models. Accordingly, cost engine 332 may disregard the third model that was generated at 723. At 733, cost engine 332 may determine a cost of the first model. It may do this by calculating the cost of each step in the first number of steps. As discussed above, the cost of each step in the first model may be determined based on statistical equations. At 732, cost engine 332 may determine a cost of the second model. It may do this by calculating the cost of each step in the second number of steps. At 735, cost engine 332 may add together the cost of each step in the first model to determine the total cost of the first model. At 736, cost engine 332 may add together the cost of each step in the second model to determine the total cost of the second model.

At 741, cost engine 332 may determine if the cost of the first model is more than the cost of the second model. Responsive to a determination that the cost of the first model is more, method 700 moves to 743. Responsive to a determination that the cost of the first model is less, method 700 moves to 742. At 743, cost engine 332 selects the second model as the pathway to carry out the operation pipeline. At 742, cost engine 332 selects the first model as the pathway to carry out the operation pipeline.

Although the flowchart of FIG. 7 shows a specific order of performance of certain functionalities, method 700 is not limited to that order. For example, some of the functionalities shown in succession may be performed in a different order, may be executed concurrently or with partial concurrence, or a combination thereof. For example, 721, 722, and 723 may be performed concurrently. In some examples, functionalities described herein in relation to FIG. 7 may be provided in combination with functionalities described herein in relation to any of FIGS. 1-6. Additionally, while FIG. 7 discusses three models and two candidate models, method 7 is not limited to the number of models or candidate models discussed. For example, hundreds of models may be generated, and additional or fewer candidate models may be determined.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A non-transitory machine-readable storage medium comprising instructions, that, when executed, cause a processing resource to:
   receive an operation pipeline for a computing system, the computing system comprising at least two memories and a number of memory side accelerators;
   build a graph comprising a model for a number of potential memory side accelerator thread assignments to carry out the operation pipeline,
   wherein each model comprises a number of steps, and at least one step
   out of the number of steps in each model comprises a function performed at one memory side accelerator out of the number of memory side accelerators; and
   determine a cost of at least one model.

2. The storage medium of claim 1, further comprising instructions, that, when executed, cause the processing resource to select a pathway to carry out the operation pipeline out of the potential memory side accelerator thread assignments based on the cost of the at least one model.

3. The storage medium of claim 1, wherein the instructions to determine the cost for the at least one model comprises instructions, that, when executed, cause the processing resource to determine a cost of each step in the at least one model.

4. The storage medium of claim 3, further comprising instructions, that when executed, cause the processing resource to determine a cost of each model.

5. The storage medium of claim 1, wherein the instructions to determine a cost of at least one model further comprises instructions, that, when executed, cause the processing resource to determine a candidate model.

6. The storage medium of claim 1, wherein the cost is determined based on a current measurement of the computing system.

7. The storage medium of claim 1, wherein the cost is determined based on historical measurements of the computing system.

8. The storage medium of claim 1, wherein the cost of the at least one model comprises an execution time of the at least one model.

9. The storage medium of claim 1, wherein the cost of the at least one model comprises an energy consumption to perform the at least one model.

10. A computing system comprising:
    a first memory;
    a first memory side accelerator attached to the first memory;
    a second memory;
    a second memory side accelerator attached to the second memory;
    a model engine to generate a model for each potential memory side accelerator thread assignment to carry out an operation pipeline for the computing system, wherein each model comprises at least one step performed by one of the first memory side accelerator and the second memory side accelerator; and a cost engine to determine a cost of at least one model.

11. The computing system of claim 10, comprising an assignment engine to select a pathway to carry out the operation pipeline based on the cost of the at least one model.

12. The computing system of claim 10, wherein the cost engine is to determine a cost of each model.

13. The computing system of claim 12, comprising an assignment engine to select a pathway to carry out the operation pipeline based on the cost of each model.

14. The computing system of claim 10, wherein the cost of the at least one model comprises an execution time of the at least one model.

15. The computing system of claim 10, wherein the cost of the at least one model comprises an energy consumption to perform the at least one model.

16. A method comprising:

receiving an operation pipeline for a computing system, the computing system comprising a first memory, a second memory, and a memory side accelerator attached to each memory;

generating a model for each potential memory side accelerator thread assignment to carry out the operation pipeline, wherein each model comprises a number of steps, and at least one step out of the number of steps in each model comprises a function performed by a memory side accelerator;

determining a cost of at least one model; and selecting a pathway to carry out the operation pipeline based on the cost of the at least one model.

17. The method of claim 16, wherein the cost of the at least one model comprises an execution time of the model.

18. The method of claim 16, wherein the cost of the at least one model comprises an energy consumption of the at least one model.

19. The method of claim 16, wherein the cost is based on a current measurement of the computing system.

20. The method of claim 16, wherein the cost is based on historical data of a past measurement of the computing system.

* * * * *